US012782798B2

(12) United States Patent
Chen et al.

(10) Patent No.: US 12,782,798 B2
(45) Date of Patent: Nov. 3, 2026

(54) ILLUMINATION SYSTEM AND PROJECTION DEVICE

(71) Applicant: Coretronic Corporation, Hsin-Chu (TW)

(72) Inventors: Chang-Hsuan Chen, Hsin-Chu (TW); Ming-Tsung Weng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 399 days.

(21) Appl. No.: 18/352,225

(22) Filed: Jul. 13, 2023

(65) Prior Publication Data

US 2024/0036451 A1 Feb. 1, 2024

(30) Foreign Application Priority Data

Jul. 28, 2022 (CN) ......................... 202210896816.1

(51) Int. Cl.
*G03B 21/20* (2006.01)

(52) U.S. Cl.
CPC ......... *G03B 21/204* (2013.01); *G03B 21/208* (2013.01)

(58) Field of Classification Search
CPC ............................ G03B 21/204; G03B 21/208
USPC .......................................................... 353/102
See application file for complete search history.

(56) References Cited

U.S. PATENT DOCUMENTS

| | | | | |
|---|---|---|---|---|
| 10,866,495 B2 | 12/2020 | Aruga | | |
| 2013/0114044 A1* | 5/2013 | Inoue | G03B 21/28 | 353/31 |
| 2015/0077714 A1* | 3/2015 | Hsieh | H04N 9/3161 | 353/31 |
| 2019/0179158 A1* | 6/2019 | Otani | G02B 27/0961 | |

FOREIGN PATENT DOCUMENTS

| | | | |
|---|---|---|---|
| CN | 104460202 | 3/2015 | |
| CN | 107045255 A * | 8/2017 | G03B 21/2053 |
| CN | 106257329 | 6/2018 | |
| CN | 106483747 | 6/2018 | |
| CN | 110389490 | 10/2019 | |
| CN | 110412817 | 11/2019 | |
| CN | 114647139 | 6/2022 | |
| CN | 216925310 | 7/2022 | |
| WO | WO-2022034926 A1 * | 2/2022 | G03B 21/2053 |

OTHER PUBLICATIONS

Translation of CN_107045255 (Year: 2026).*
Translation of WO_2022034926_A1 (Year: 2026).*
"Office Action of China Counterpart Application", issued on May 11, 2026, p. 1-p. 14.

* cited by examiner

*Primary Examiner* — Jerry L Brooks
(74) *Attorney, Agent, or Firm* — JCIPRNET

(57) ABSTRACT

The disclosure provides an illumination system including a light source module and a light deflection and diffusion element. The light source module is configured to emit at least one excitation light beam. The light deflection and diffusion element is disposed on a transmission path of the excitation light beam. The light deflection and diffusion (Continued)

element has a central axis. The light deflection and diffusion element includes a plurality of inclined surfaces. Each inclined surface has a different normal direction. The inclined surface is configured to deflect the excitation light beam toward the central axis of the light deflection and diffusion element. The disclosure also provides a projection device including the illumination system.

21 Claims, 12 Drawing Sheets

ILLUMINATION SYSTEM AND PROJECTION DEVICE

CROSS-REFERENCE TO RELATED APPLICATION

This application claims the priority benefit of China application serial no. 202210896816.1, filed on Jul. 28, 2022. The entirety of the above-mentioned patent application is hereby incorporated by reference herein and made a part of this specification.

BACKGROUND

Technical Field

The disclosure relates to an optical system and an optical device, and more particularly relates to an illumination system and a projection device.

Description of Related Art

The main structure of the existing projection device (projector) includes an illumination system, a light valve, and a projection lens. The illumination system includes a light source and other optical elements. However, multiple light spots formed by the excitation light beam emitted from the light source on each optical element (such as condenser lens or wavelength conversion element (phosphor wheel)) in the projection device may be overly concentrated, which may cause the temperature of each optical element to be overly high to burn the optical element, and result in poor brightness and performance of the projection device.

In order to prevent the optical element of the projection device from being burned due to overly high temperature, the related art proposes to add a beam diffusion element to the transmission path of the excitation light beam to diffuse the excitation light beam, thereby reducing the energy density of the excitation light beam. The addition of a beam diffusion element can expand the light spot formed on each optical element, but since the excitation light beam is diffused, a larger optical element (such as condenser lens) is required, which increases the production cost of the projection device and the illumination system.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides an illumination system and a projection device, which reduce the risk of burning an optical element in the illumination system and the projection device due to overly high temperature, and reduce the production cost of the illumination system and the projection device.

Other objectives and advantages of the disclosure can be further understood from the technical features disclosed in the disclosure.

To achieve one or some or all of the above objectives or other objectives, an embodiment of the disclosure provides an illumination system, which includes a light source module and a light deflection and diffusion element. The light source module is configured to emit at least one excitation light beam. The light deflection and diffusion element is disposed on a transmission path of the excitation light beam. The light deflection and diffusion element has a central axis. The light deflection and diffusion element includes a plurality of inclined surfaces. Each inclined surface has a different normal direction. The inclined surface is configured to deflect the excitation light beam toward the central axis of the light deflection and diffusion element.

To achieve one or some or all of the above objectives or other objectives, an embodiment of the disclosure provides a projection device, which includes an illumination system, a wavelength conversion element, a light valve, and a projection lens. The illumination system includes a light source module and a light deflection and diffusion element. The light source module is configured to emit at least one excitation light beam. The light deflection and diffusion element is disposed on a transmission path of the excitation light beam. The light deflection and diffusion element includes a plurality of inclined surfaces. The inclined surfaces have different normal directions and are configured to deflect the excitation light beam toward a central axis of the light deflection and diffusion element. The wavelength conversion element is disposed on the transmission path of the excitation light beam from the light deflection and diffusion element and is configured to convert the excitation light beam from the light source module into a conversion light beam, wherein the excitation light beam and the conversion light beam form an illumination light beam in a sequential manner by the wavelength conversion element. The illumination light beam includes at least one of the excitation light beam and the conversion light beam. The light valve is disposed on a transmission path of the illumination light beam from the wavelength conversion element and is configured to convert the illumination light beam into an image light beam. The projection lens is disposed on a transmission path of the image light beam and is configured to project the image light beam out of the projection device.

To achieve one or some or all of the above objectives or other objectives, an embodiment of the disclosure provides a projection device including an illumination system, a light valve, and a projection lens. The light source module is configured to emit at least one excitation light beam. The light deflection and diffusion element is disposed on a transmission path of the excitation light beam. The light deflection and diffusion element includes a plurality of inclined surfaces. The inclined surfaces have different normal directions and are configured to deflect the excitation light beam toward a central axis of the light deflection and diffusion element. The light valve is disposed on the transmission path of the excitation light beam from the light source module and is configured to convert the excitation light beam into an image light beam. The projection lens is disposed on a transmission path of the image light beam and is configured to project the image light beam out of the projection device.

Based on the above, in an embodiment of the disclosure, the illumination system and the projection device are provided with the light deflection and diffusion element having light diffusion and deflection effects so as to diffuse the light spot formed by the excitation light beam on the optical element of the projection device, thereby reducing the energy density and preventing the burning of the optical element in the projection device. Furthermore, since the excitation light beam is deflected by the light deflection and diffusion element, the size of the condenser lens can be reduced to reduce the production cost of the illumination system and the projection device.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is configured to purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
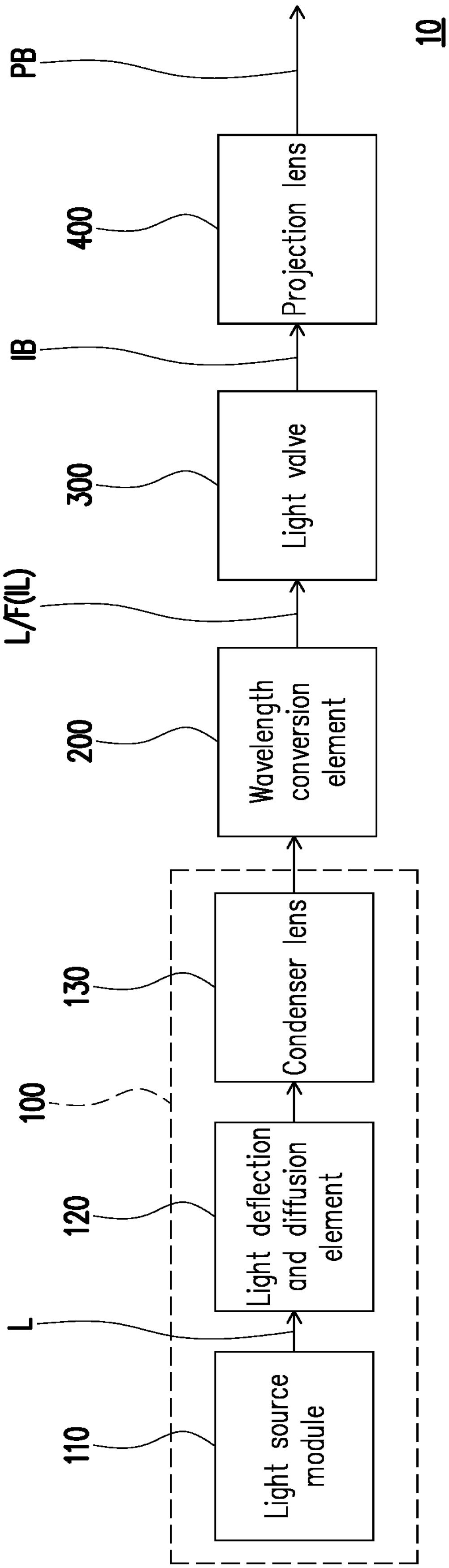
FIG. 1 is a schematic diagram of the projection device according to the first embodiment of the disclosure.
Figure 2:
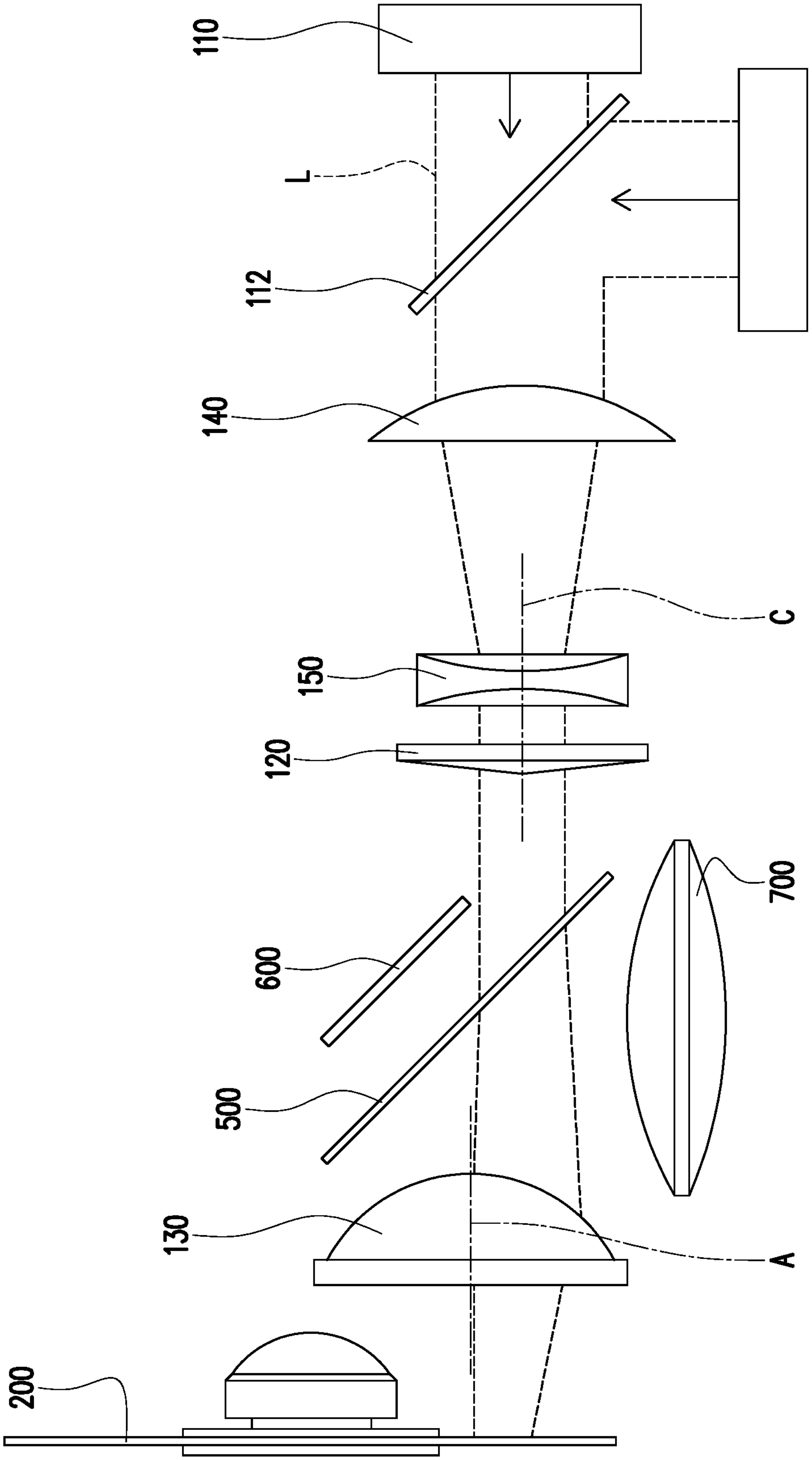
FIG. 2 is a partial schematic view of the projection device according to the first embodiment of the disclosure.

FIG. 1 is a schematic diagram of a projection device according to an embodiment of the disclosure. FIG. 2 is a partial schematic view of the projection device according to the first embodiment of the disclosure, wherein a light valve 300 and a projection lens 400 in FIG. 1 are omitted from FIG. 2. Referring to FIG. 1 and FIG. 2 first, the projection device 10 in this embodiment includes an illumination system 100, a wavelength conversion element 200, the light valve 300, and the projection lens 400. The illumination system 100 includes a light source module 110 and a light deflection and diffusion element 120. The light source module 110 is configured to emit at least one excitation light beam L. The light deflection and diffusion element 120 is disposed on the transmission path of the excitation light beam L. The wavelength conversion element 200 is disposed on the transmission path of the excitation light beam L from the light deflection and diffusion element 120 and is configured to convert the excitation light beam L from the light source module 110 into a conversion light beam F. The excitation light beam L and the conversion light beam F form an illumination light beam IL in a sequential manner by the wavelength conversion element 200. In other words, the illumination light beam IL is sequentially formed by at least one of the excitation light beam L and the conversion light beam F. The light valve 300 is disposed on the transmission path of the illumination light beam IL from the wavelength conversion element 200, and the light valve 300 is configured to convert the illumination light beam IL into an image light beam IB. The projection lens 400 is disposed on the transmission path of the image light beam IB, and the projection lens 400 is configured to project the image light beam IB out of the projection device 10 to form a projection light beam PB projected onto a projection target (not shown), such as a screen or a wall.

In this embodiment, the light source module 110 may be a light-emitting diode (LED), a laser diode (LD), a combination thereof, or other suitable light sources, but the disclosure is not limited thereto. The excitation light beam L may be a red light beam, a green light beam, a blue light beam, an infrared light beam, an ultraviolet light beam, or light beams of other colors.

In this embodiment, the wavelength conversion element 200 is, for example, a phosphor wheel, and the wavelength conversion element 200 may include a wavelength conversion region and a non-conversion region. The wavelength conversion element 200 may be a transmissive wavelength conversion element or a reflective wavelength conversion element. In this embodiment, which takes a reflective wavelength conversion element as an example, when the excitation light beam L is incident on the wavelength conversion region, the wavelength conversion region converts the excitation light beam L into the conversion light beam F, and transmits the conversion light beam F to the light valve 300. Taking a blue light beam as an example of the excitation light beam L, the conversion light beam F may be a red light beam, a green light beam, a yellow light beam, or a combination thereof. When the excitation light beam L is incident on the non-conversion region, the non-conversion region reflects the excitation light beam L to the light valve 300.

In this embodiment, the light valve 300 is, for example, a spatial light modulator such as a digital micro-mirror device (DMD), a liquid-crystal-on-silicon panel (LCOS panel), or a liquid crystal panel (LCD). The projection lens 400 is, for example, a combination including one or more optical lenses with a diopter. The optical lenses include, for example, various combinations of non-planar lenses such as bi-concave lenses, bi-convex lenses, concave-convex lenses, convex-concave lenses, plano-convex lenses, and plano-concave lenses. The disclosure is not intended to limit the forms and types of the light valve 300 and the projection lens 400.

Specifically, in this embodiment, the light source module 110 includes a plurality of excitation light sources arranged in an array, and more than one light source module 110 may be provided. The illumination system 100 may also include a light combining element 112. The light combining element 112 is, for example, a dichroic element or is composed of a plurality of dichroic mirrors. The light combining element 112 is disposed between the light source module 110 and the light deflection and diffusion element 120, and the light combining element 112 is configured to transmit or reflect the excitation light beams L from different light source modules 110, so that the plurality of excitation light beams L can be guided to the light deflection and diffusion element 120.

In an embodiment, the illumination system 100 may further include a lens 140, a lens 150, a dichroic element 500, a reflector 600, and a condenser lens 130. The lens 140 and the lens 150 are configured to condense and collimate the excitation light beam L, respectively. The excitation light beam L from the light source module 110 passes through the lens 140 and the lens 150 sequentially and then is transmitted to the light deflection and diffusion element 120.

In this embodiment, the condenser lens 130 is disposed on the transmission path of the excitation light beam L from the light deflection and diffusion element 120 and is located between the light deflection and diffusion element 120 and the wavelength conversion element 200. The central axis C of the light deflection and diffusion element 120 does not overlap with the optical axis A of the condenser lens 130. For example, in the direction of gravity, the central axis C is located below the optical axis A, and the excitation light beam L from the light deflection and diffusion element 120 only passes through the lower half of the condenser lens 130.

In an embodiment, the dichroic element 500 may include an upper region and a lower region. For example, the upper region is configured to partially transmit and partially reflect light of the same light color (for example, blue) as the excitation light beam L, and reflect light of the same light color (for example, yellow) as the conversion light beam F. The lower region is configured to transmit light of the same light color as the excitation light beam L and reflect light of the same light color as the conversion light beam F. When the projection device 10 is in the timing of the conversion light beam F, the excitation light beam L from the light deflection and diffusion element 120 first passes through the lower region of the dichroic element 500 and then passes through the condenser lens 130 to be incident on the wavelength conversion region of the wavelength conversion element 200, and then the excitation light beam L is converted into the conversion light beam F. Next, the conversion light beam F passes through the condenser lens 130 and is then reflected by the dichroic element 500 to the light valve 300 (shown in FIG. 1). When the projection device 10 is in the timing of the excitation light beam L, the excitation light beam L from the light deflection and diffusion element 120 first passes through the lower region of the dichroic element 500 and then passes through the condenser lens 130 to be incident on the non-conversion region of the wavelength conversion element 200. After the non-conversion region reflects the excitation light beam L to the upper region of the dichroic element 500, the upper region reflects a part of the excitation light beam L to the light valve 300, and transmits another part of the excitation light beam L to the reflector 600. The another part of the excitation light beam L transmitted to the reflector 600 is then reflected to the light valve 300. Therefore, the conversion light beam F and the excitation light beam L which are transmitted to the light valve 300 at different timings as described above form the illumination light beam IL.

In an embodiment, the projection device 10 may further include a lens 700. The lens 700 is on the transmission path of the illumination light beam IL and is disposed between the dichroic element 500 and the light valve 300.

In another embodiment, the projection device 10 may further include a light uniformizing element (not shown). The light uniformizing element is on the transmission path of the illumination light beam IL and is disposed between the lens 700 and the light valve 300. The light uniformizing element is, for example, an integration rod, a lens array, or other optical elements having a light uniformizing effect.

Figure 3:
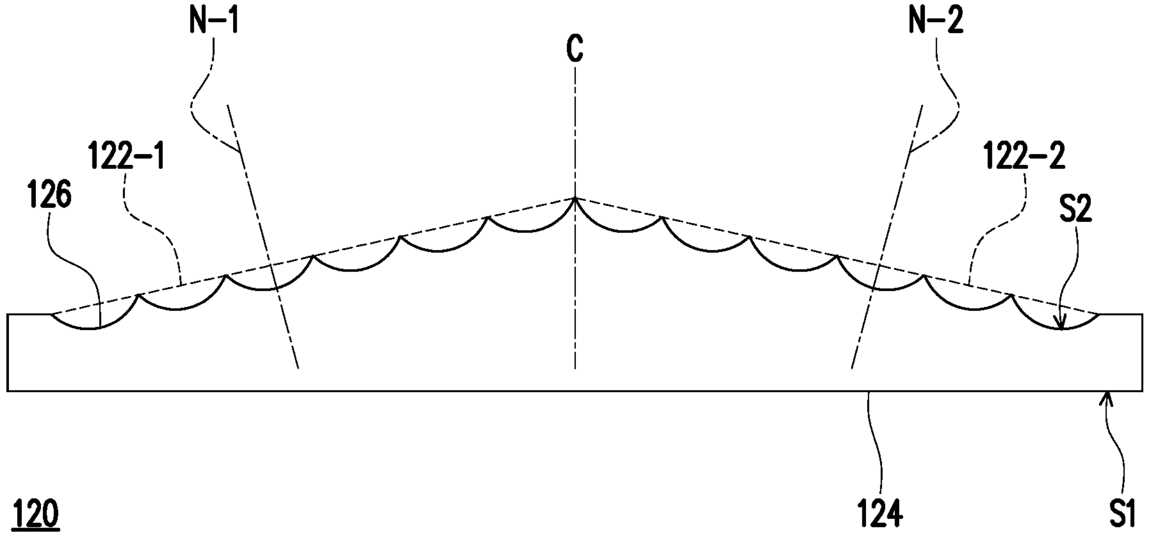
FIG. 3 is a schematic cross-sectional view of the light deflection and diffusion element in FIG. 2.
Figure 4:
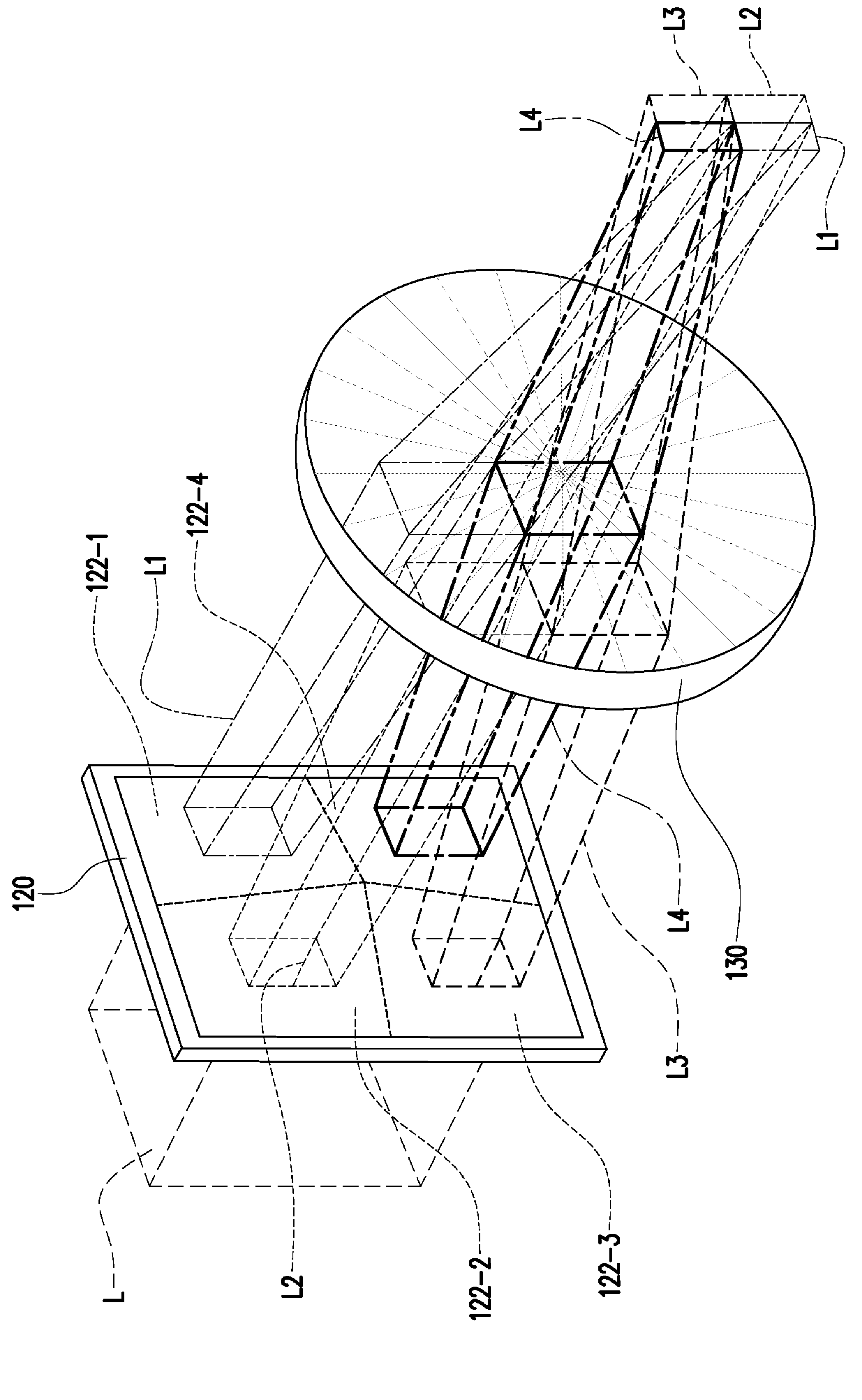
FIG. 4 is a schematic view of the light deflection and diffusion element and the condenser lens in FIG. 2.
Figure 5:
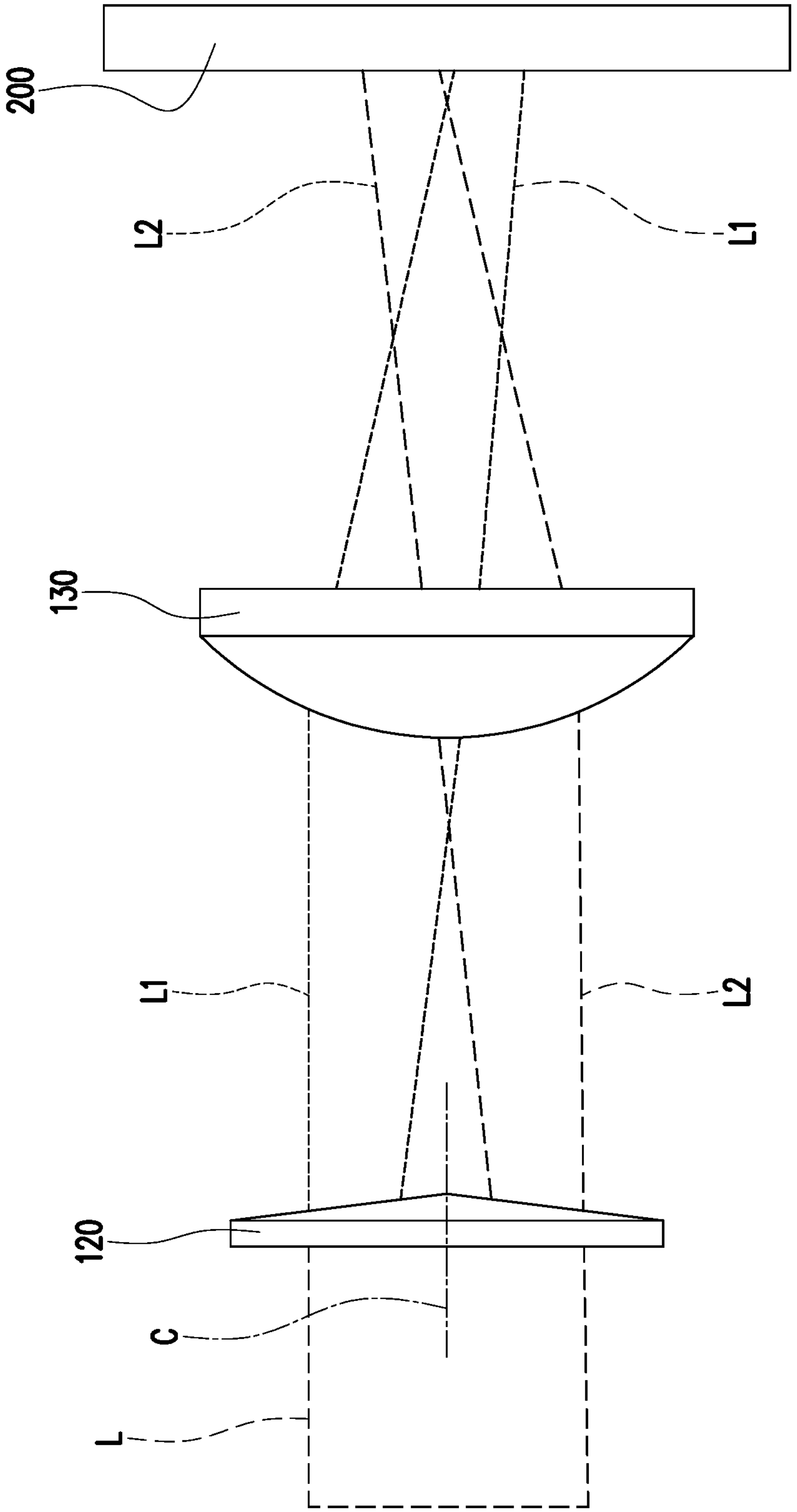
FIG. 5 is a schematic view of the light deflection and diffusion element, the condenser lens, and the wavelength conversion element in FIG. 2.

FIG. 3 is a schematic cross-sectional view of the light deflection and diffusion element in FIG. 2. FIG. 4 is a schematic view of the light deflection and diffusion element and the condenser lens in FIG. 2. FIG. 5 is a schematic view of the light deflection and diffusion element, the condenser lens, and the wavelength conversion element in FIG. 2. Referring to FIG. 2 to FIG. 5, in this embodiment, the light deflection and diffusion element 120 has the central axis C and includes a plurality of inclined surfaces 122-1 and 122-2. The inclined surfaces 122-1 and 122-2 have different normal directions N-1 and N-2 and are configured to deflect the excitation light beam L incident on the inclined surfaces 122-1 and 122-2 toward the central axis C of the light deflection and diffusion element 120 (as shown in FIG. 4 and FIG. 5). Each of the inclined surfaces 122-1 and 122-2 has a plurality of microlenses 126. The microlens 126 is configured to diffuse the excitation light beam L. That is to say, the design of the inclined surfaces 122-1 and 122-2 and the microlenses 126 allows the light deflection and diffusion element 120 to have both the functions of light deflection and light diffusion.

Figure 9:
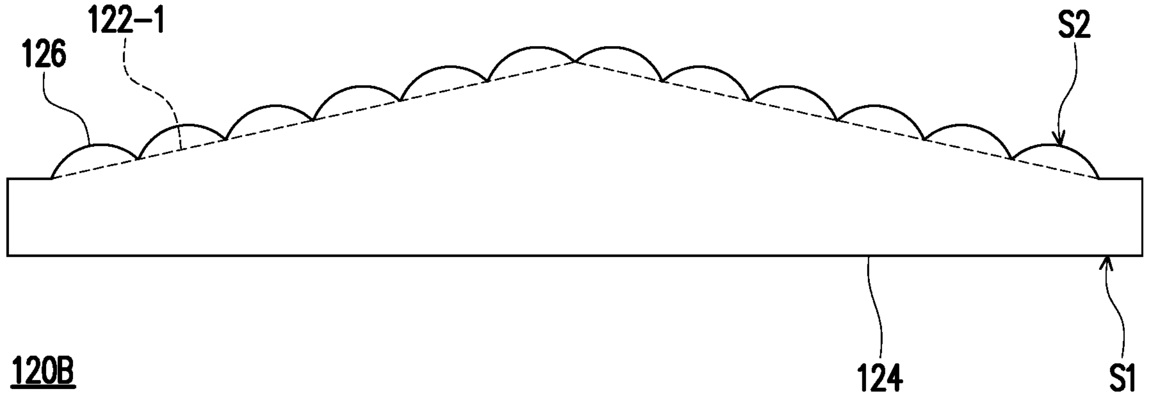
FIG. 9 is a schematic view of the light deflection and diffusion element of the projection device according to the second embodiment of the disclosure.

In this embodiment, each of the microlenses 126 is a convex lens (as shown in FIG. 9) or a concave lens (as shown in FIG. 3). However, in another embodiment, the microlens 126 may be a convex lens, a concave lens, or a combination thereof.

Figure 12:
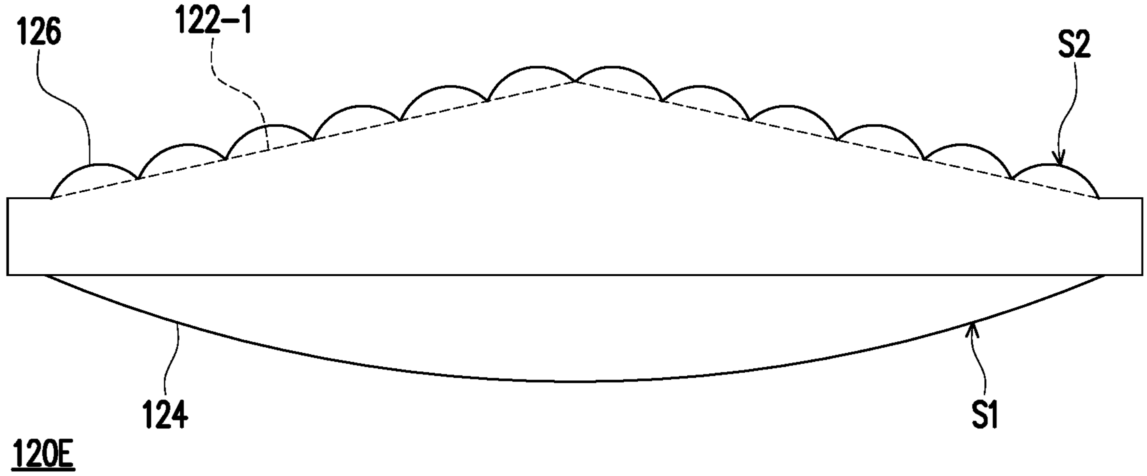
FIG. 12 is a schematic view of the light deflection and diffusion element of the projection device according to the fifth embodiment of the disclosure.
Figure 13:
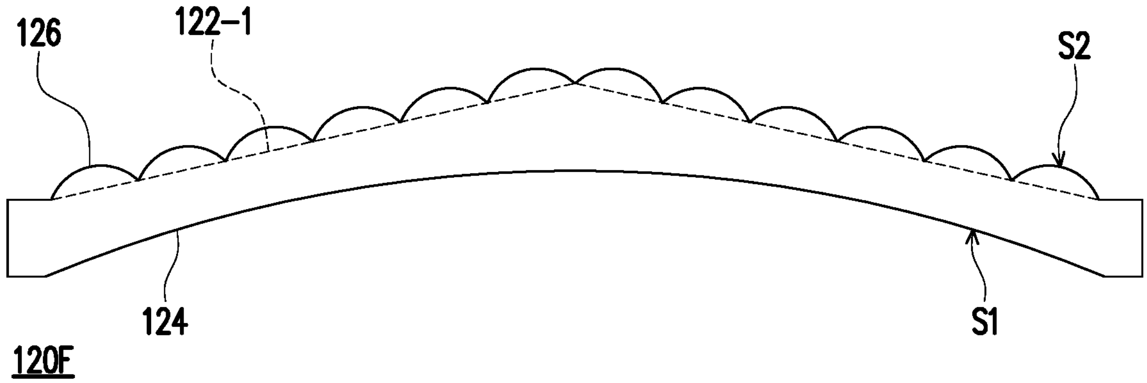
FIG. 13 is a schematic view of the light deflection and diffusion element of the projection device according to the sixth embodiment of the disclosure.
Figure 14:
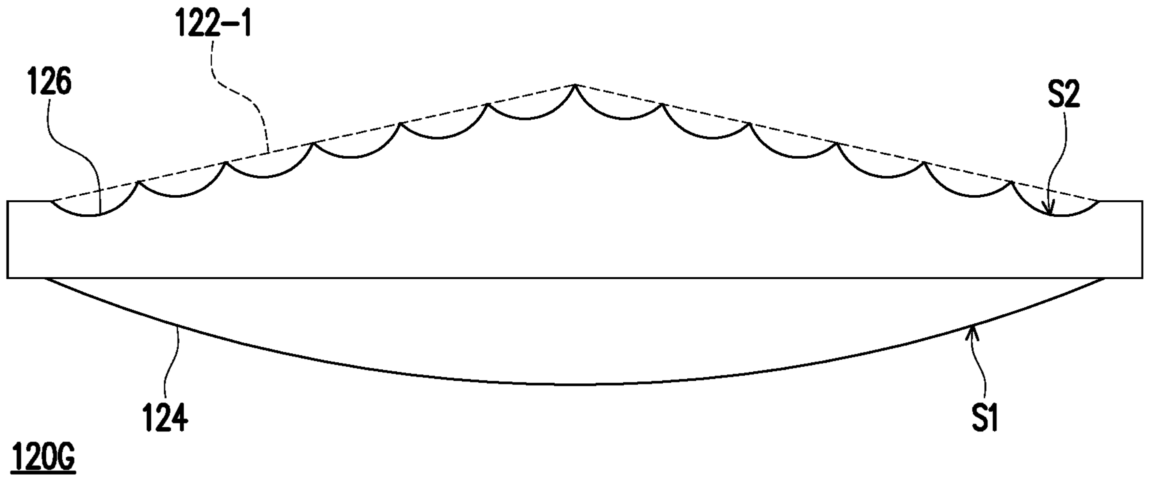
FIG. 14 is a schematic view of the light deflection and diffusion element of the projection device according to the seventh embodiment of the disclosure.
Figure 15:
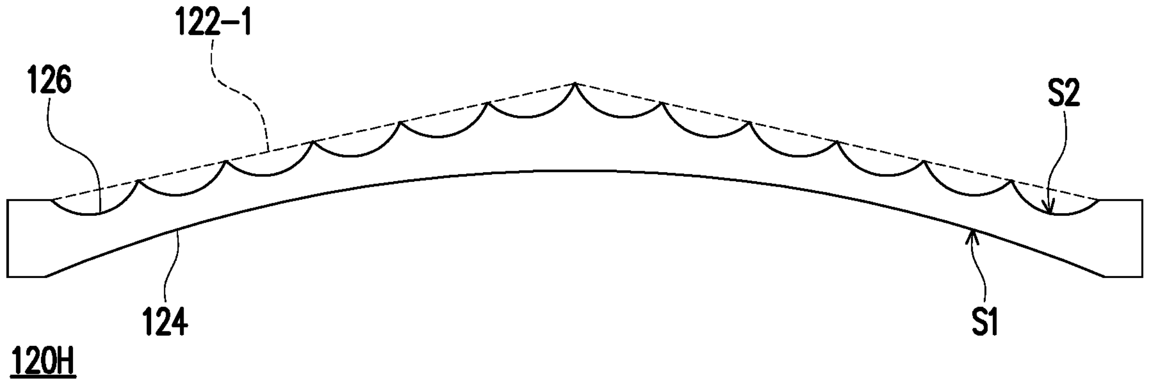
FIG. 15 is a schematic view of the light deflection and diffusion element of the projection device according to the eighth embodiment of the disclosure.

In this embodiment, the light deflection and diffusion element 120 further includes a bottom surface 124. The bottom surface 124 is located on the first side S1 of the light deflection and diffusion element 120. The inclined surfaces 122-1 and 122-2 are located on the second side S2 opposite to the first side S1. In this embodiment, the first side S1 is a light exit side and the second side S2 is a light incident side. In another embodiment, the first side S1 is a light incident side and the second side S2 is a light exit side. In an embodiment, the bottom surface 124 may be a flat surface (as shown in FIG. 3), a convex surface (as shown in FIG. 12 and FIG. 14), or a concave surface (as shown in FIG. 13 and FIG. 15).

Figure 6:
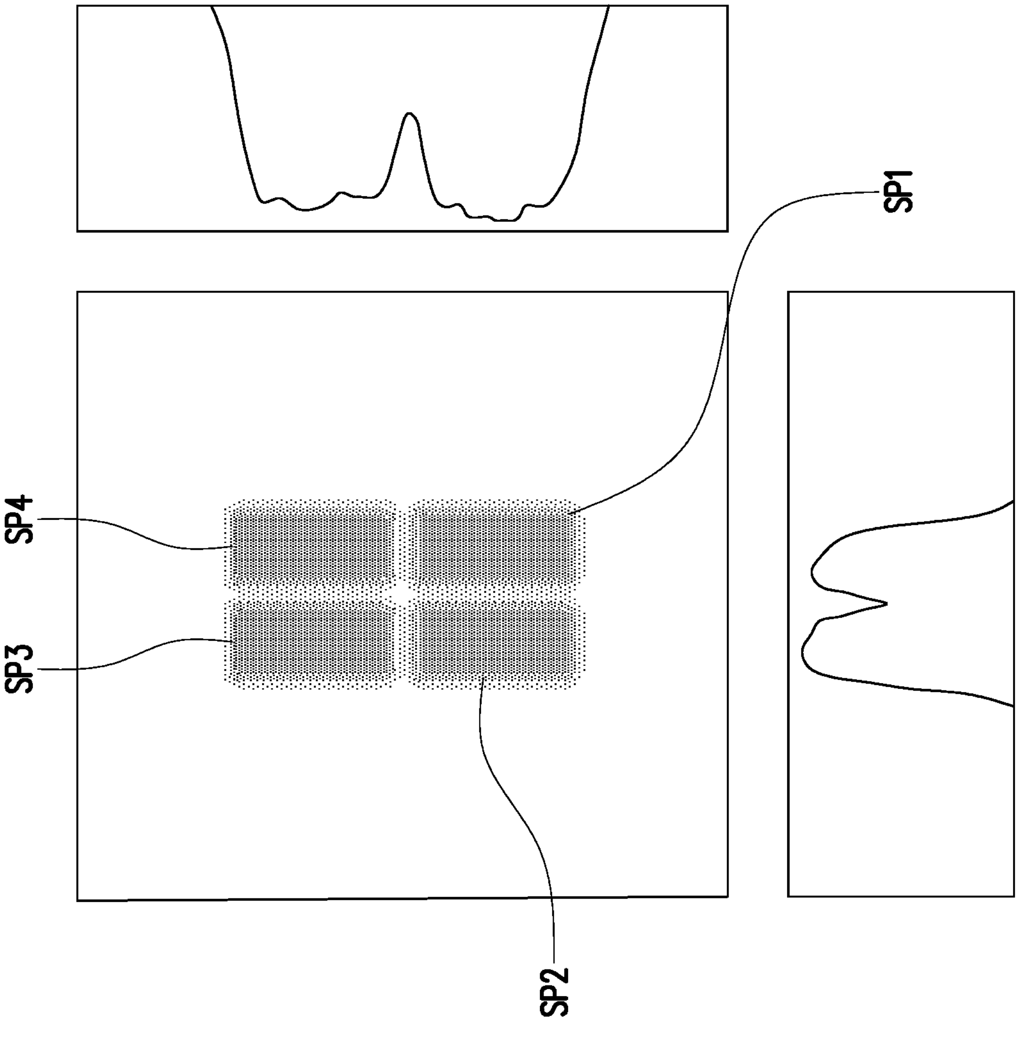
FIG. 6 is a schematic view of the excitation light beam passing through the light deflection and diffusion element and then forming a plurality of sub-light spots on the condenser lens or the wavelength conversion element in the projection device according to an embodiment of the disclosure.
Figure 7:
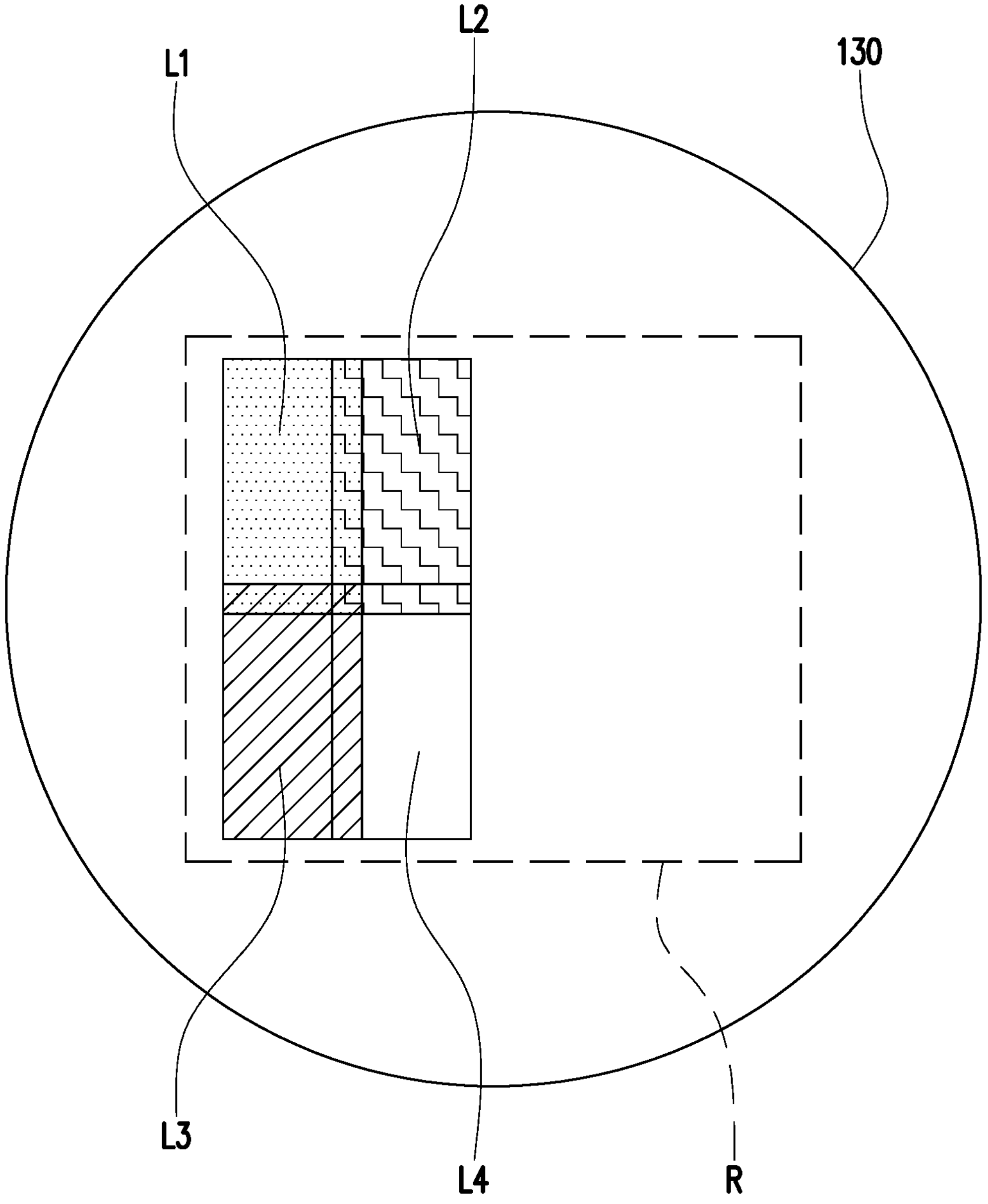
FIG. 7 is a schematic view of the excitation light beam passing through the light deflection and diffusion element and then forming a plurality of sub-light spots on the condenser lens in the projection device according to an embodiment of the disclosure.

FIG. 6 is a schematic view of the excitation light beam passing through the light deflection and diffusion element and then forming a plurality of sub-light spots on the condenser lens or the wavelength conversion element in the projection device according to an embodiment of the disclosure. The right side and the lower side of FIG. 6 respectively illustrate graphs of the normalized luminance of vertical and horizontal light spots with respect to the light spot size. FIG. 7 is a schematic view of the excitation light beam passing through the light deflection and diffusion element and then forming a plurality of sub-light spots on the condenser lens in the projection device according to an embodiment of the disclosure.

Referring to FIG. 4 to FIG. 7, in this embodiment, the light deflection and diffusion element 120 has at least two inclined surfaces, and the at least two inclined surfaces are connected to each other to form a roof-like structure, which can divide the excitation light beam L. In this embodiment, the number of the inclined surfaces is four. The inclined surfaces 122-1, 122-2, 122-3, and 122-4 are configured to divide the excitation light beam L into a plurality of sub-light beams L1, L2, L3, and L4, and the inclined surfaces 122-1, 122-2, 122-3, and 122-4 correspond to the sub-light beams L1, L2, L3, and L4, respectively. The sub-light beams L1, L2, L3, and L4 are transmitted in different directions, respectively, and the sub-light beams L1, L2, L3, and L4 are crossed and then transmitted to the condenser lens 130 or the wavelength conversion element 200 to form a plurality of sub-light spots SP1, SP2, SP3, and SP4. That is to say, the inclined surfaces 122-1, 122-2, 122-3, and 122-4 are configured to cause the excitation light beam L to form a plurality of sub-light spots SP1, SP2, SP3, and SP4 on the condenser lens 130 and the wavelength conversion element 200, and the number of the sub-light spots SP1, SP2, SP3, and SP4 is equal to the number of the inclined surfaces 122-1, 122-2, 122-3, and 122-4. In addition, the maximum width of the irradiation region formed by the sub-light spots SP1, SP2, SP3, and SP4 is less than or equal to the maximum width of the light spot formed by the excitation light beam L incident on the light deflection and diffusion element 120.

In this embodiment, the design of the light deflection and diffusion element 120 allows the sub-light spots SP1, SP2, SP3, and SP4 to be formed on the condenser lens 130 or the wavelength conversion element 200, and the overlapping area of any two adjacent sub-light spots SP1, SP2, SP3, and SP4 is less than half of the area of any one of the sub-light spots SP1, SP2, SP3, and SP4. Therefore, the uniformity of light output of the projection device 10 can be effectively improved.

Figure 8:
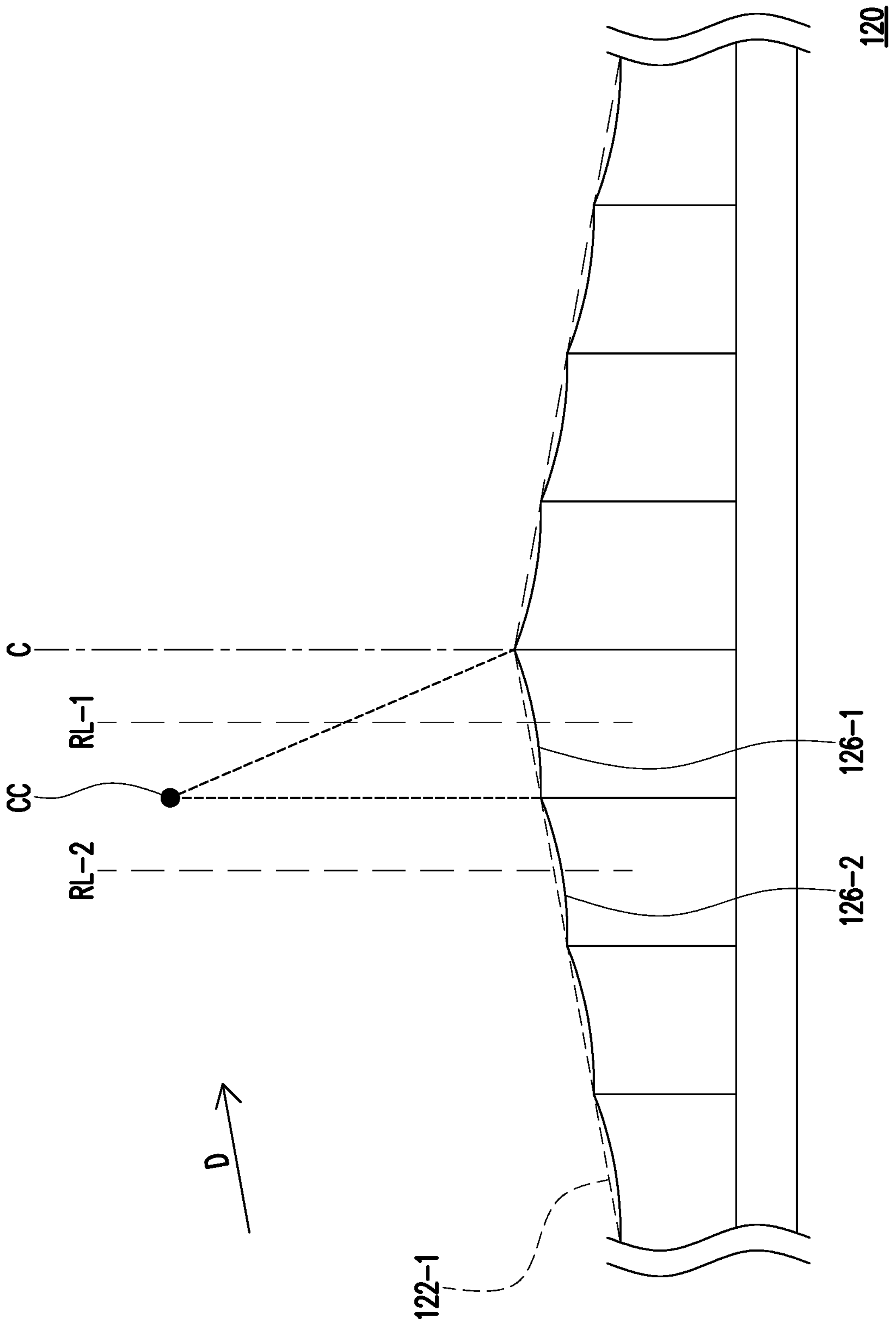
FIG. 8 is an enlarged schematic view of the light deflection and diffusion element of the projection device according to an embodiment of the disclosure.

FIG. 8 is an enlarged schematic view of the light deflection and diffusion element of the projection device according to an embodiment of the disclosure. Referring to FIG. 8, in this embodiment, a first microlens 126-1 and a second microlens 126-2 which are adjacently arranged along the oblique direction D are provided on the above-mentioned inclined surfaces 122-1, 122-2, 122-3, and 122-4. Here, the inclined surface is defined as that a plane formed by two end points of a plurality of microlenses (such as the first microlens 126-1 and the second microlens 126-2) is inclined with respect to the bottom surface 124 (shown in FIG. 3) of the light deflection and diffusion element 120. The oblique direction D is, for example, the extending direction of the inclined surfaces 122-1, 122-2, 122-3, and 122-4. The first microlens 126-1 is disposed between the central axis C and the second microlens 126-2 in the oblique direction D. Along the oblique direction D, the distances between the vertexes of a plurality of microlenses of the plurality of inclined surfaces 122-1, 122-2, 122-3, and 122-4 and the bottom surface 124 gradually increase. The curvature center CC of the first microlens 126-1 is located between two reference straight lines RL-1 and RL-2. The two reference straight lines RL-1 and RL-2 respectively pass through the centers of the first microlens 126-1 and the second microlens 126-2 and are parallel to the central axis C. In this embodiment, the design of the plurality of inclined surfaces and the limitation on the positions of the curvature centers CC of the plurality of microlenses cause the sub-light beams L1, L2, L3, and L4 to be deflected toward the central axis C, which achieves a light diffusion effect.

Based on the above, in an embodiment of the disclosure, the illumination system 100 and the projection device 10 include the light deflection and diffusion element 120 having a light diffusion effect so as to diffuse the light spot of the excitation light beam L projected on the optical element (for example, the condenser lens 130 or the wavelength conversion element 200), thereby reducing the energy density and preventing the burning of the optical element in the projection device. Furthermore, the light deflection and diffusion element 120 includes a plurality of inclined surfaces 122-1 and 122-2, and the inclined surfaces 122-1 and 122-2 have different normal directions N-1 and N-2 so as to deflect the excitation light beam L toward the central axis C of the light deflection and diffusion element 120. That is to say, the light spot size and distribution position of the excitation light beam L projected on the optical element can be adjusted through the light deflection and diffusion element 120, which not only reduces the energy density of the excitation light beam L on the wavelength conversion element 200 to improve the light conversion efficiency but also maintains favorable light condensing efficiency for the condenser lens 130.

For example, as shown in FIG. 7, the transmission direction of the excitation light beam L is deflected toward the central axis C by the light deflection and diffusion element 120, which limits the range of the condenser lens 130 where the excitation light beam L passes through within the region R close to the optical axis A of the condenser lens 130. As a result, a part of the excitation light beam is prevented from passing through the edge of the condenser lens, which may cause the problems of poor light condensing efficiency, reduced overall brightness, and poor focusing capability. That is to say, the illumination system 100 and the projection device 10 according to the embodiment of the disclosure can produce better optical effects. Since the excitation light beam L is deflected by the light deflection and diffusion element 120, the lens size of the condenser lens 130 can be reduced, so the production cost of the illumination system 100 and the projection device 10 can be reduced. Similarly, because of the light beam deflection effect of the light deflection and diffusion element 120, multiple sets of light source modules 110 (as shown in FIG. 2) can be used, which not only improves the space utilization of the illumination system 100 and the projection device 10 but also improves the overall brightness of the projection device 10.

FIG. 9 is a schematic view of the light deflection and diffusion element of the projection device according to the second embodiment of the disclosure. Referring to FIG. 9, the light deflection and diffusion element 120B is similar to the light deflection and diffusion element 120 in FIG. 3, and the main differences are as follows. In this embodiment, each of the microlenses 126 of the light deflection and diffusion element 120B is a convex lens. The convex lens of the light deflection and diffusion element 120B has similar optical effects to the concave lens of the light deflection and diffusion element 120. The advantages of the light deflection and diffusion element 120B in this embodiment are similar to those of the light deflection and diffusion element 120 in FIG. 3, and details thereof are not described herein again.

Figure 10:
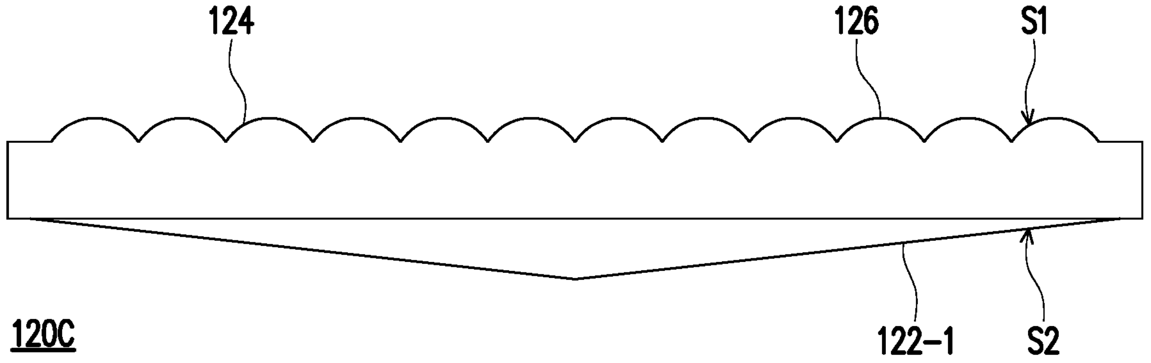
FIG. 10 is a schematic view of the light deflection and diffusion element of the projection device according to the third embodiment of the disclosure.

FIG. 10 is a schematic view of the light deflection and diffusion element of the projection device according to the third embodiment of the disclosure. Referring to FIG. 10, the light deflection and diffusion element 120C is similar to the light deflection and diffusion element 120 in FIG. 3, and the main differences are as follows. In this embodiment, the inclined surface 122 of the light deflection and diffusion element 120C is a plane, and the bottom surface 124 of the light deflection and diffusion element 120C has a plurality of microlenses 126, and the microlens 126 is a convex lens. The microlens 126 is configured to diffuse the excitation light beam L. The advantages of the light deflection and diffusion element 120C in this embodiment are similar to those of the light deflection and diffusion element 120 in FIG. 3, and details thereof are not described herein again.

Figure 11:
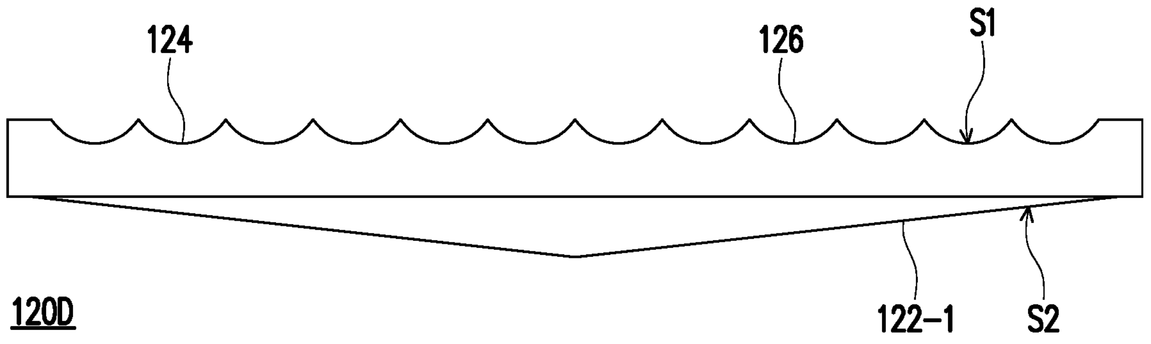
FIG. 11 is a schematic view of the light deflection and diffusion element of the projection device according to the fourth embodiment of the disclosure.

FIG. 11 is a schematic view of the light deflection and diffusion element of the projection device according to the fourth embodiment of the disclosure. Referring to FIG. 11, the light deflection and diffusion element 120D is similar to the light deflection and diffusion element 120C in FIG. 10, and the main differences are as follows. In this embodiment, the microlens 126 is a concave lens. The advantages of the light deflection and diffusion element 120D in this embodiment are similar to those of the light deflection and diffusion element 120C in FIG. 10, and details thereof are not described herein again.

FIG. 12 is a schematic view of the light deflection and diffusion element of the projection device according to the fifth embodiment of the disclosure. Referring to FIG. 12, the light deflection and diffusion element 120E is similar to the light deflection and diffusion element 120B in FIG. 9, and the main differences are as follows. In this embodiment, the bottom surface 124 of the light deflection and diffusion element 120E is a convex surface. The convex bottom surface 124 can produce a capability similar to that of a condenser lens, so that the light deflection and diffusion element 120E has multiple functions, thereby reducing the production cost of the illumination system 100 and the projection device 10. The other advantages of the light deflection and diffusion element 120E in this embodiment are similar to those of the light deflection and diffusion element 120B in FIG. 9, and details thereof are not described herein again.

FIG. 13 is a schematic view of the light deflection and diffusion element of the projection device according to the sixth embodiment of the disclosure. Referring to FIG. 13, the light deflection and diffusion element 120F is similar to the light deflection and diffusion element 120B in FIG. 9, and the main differences are as follows. In this embodiment, the bottom surface 124 of the light deflection and diffusion element 120F is a concave surface. The concave bottom surface 124 can produce a capability similar to that of a collimating lens, so that the light deflection and diffusion element 120F has multiple functions, thereby reducing the production cost of the illumination system 100 and the projection device 10. The other advantages of the light deflection and diffusion element 120F in this embodiment are similar to those of the light deflection and diffusion element 120B in FIG. 9, and details thereof are not described herein again.

FIG. 14 is a schematic view of the light deflection and diffusion element of the projection device according to the seventh embodiment of the disclosure. Referring to FIG. 14, the light deflection and diffusion element 120G is similar to the light deflection and diffusion element 120 in FIG. 3, and the main differences are as follows. In this embodiment, the bottom surface 124 of the light deflection and diffusion element 120G is a convex surface. The convex bottom surface 124 can produce a capability similar to that of a condenser lens, so that the light deflection and diffusion element 120G has multiple functions, thereby reducing the production cost of the illumination system 100 and the projection device 10. The other advantages of the light deflection and diffusion element 120G in this embodiment are similar to those of the light deflection and diffusion element 120 in FIG. 3, and details thereof are not described herein again.

FIG. 15 is a schematic view of the light deflection and diffusion element of the projection device according to the eighth embodiment of the disclosure. Referring to FIG. 15, the light deflection and diffusion element 120H is similar to the light deflection and diffusion element 120 in FIG. 3, and the main differences are as follows. In this embodiment, the bottom surface 124 of the light deflection and diffusion element 120H is a concave surface. The concave bottom surface 124 can produce a capability similar to that of a collimating lens, so that the light deflection and diffusion element 120H has multiple functions, thereby reducing the production cost of the illumination system 100 and the projection device 10. The other advantages of the light deflection and diffusion element 120H in this embodiment are similar to those of the light deflection and diffusion element 120 in FIG. 3, and details thereof are not described herein again.

Figure 16:
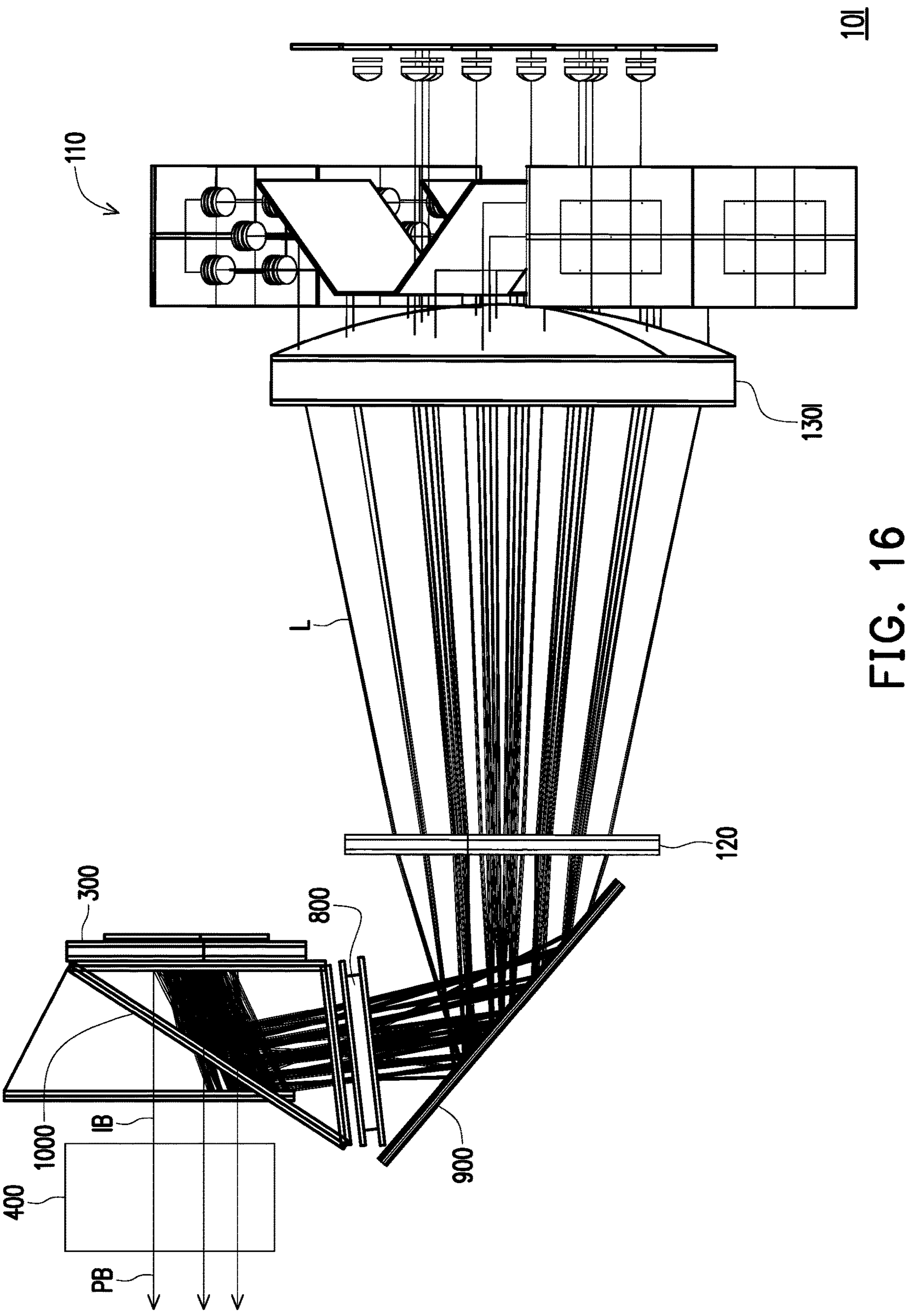
FIG. 16 is a schematic view of the projection device according to the ninth embodiment of the disclosure.

FIG. 16 is a schematic view of the projection device according to the ninth embodiment of the disclosure. Referring to FIG. 16, the projection device 10I is similar to the projection device 10 in FIG. 2, and the main differences are as follows. In this embodiment, the projection device 10I includes the illumination system 100, the light valve 300, and the projection lens 400. The light valve 300 is disposed on the transmission path of the excitation light beam L from the light source module 110 and is configured to convert the excitation light beam L into the image light beam IB.

In this embodiment, the light source module 110 of the illumination system 100 includes a plurality of light sources that emit excitation light beams L of two or more different wavelengths. The excitation light beams L can be emitted by the plurality of light sources simultaneously or sequentially. The excitation light beam L is incident on the light valve 300 after passing through the light deflection and diffusion element 120. The projection device 10I in this embodiment does not need to use optical elements such as the wavelength conversion element, so the production cost of the projection device 10I is reduced.

In this embodiment, the projection device 10I further includes the condenser lens 130I. The condenser lens 130I is disposed on the transmission path of the excitation light beam L and is disposed between the light source module 110 and the light deflection and diffusion element 120.

In this embodiment, the projection device 10I further includes a light beam adjustment element 800. The light beam adjustment element 800 is disposed on the transmission path of the excitation light beam L and is disposed between the light deflection and diffusion element 120 and the light valve 300. The light beam adjustment element 800 includes at least one of a depolarizer and a despeckle element. The light beam adjustment element 800 is configured to adjust the light beam. For example, the depolarizer is configured to depolarize the excitation light beam L and the despeckle element is configured to eliminate speckles of the excitation light beam L. The despeckle element is, for example, a diffusion sheet or an optical element vibrating device. Therefore, the light beam adjustment element 800 improves the overall image effect of the image light beam IB or the projection light beam PB.

In addition, the projection device 10I further includes a mirror 900 and a prism group 1000. The mirror 900 is disposed between the light beam adjustment element 800 and the light valve 300 on the transmission path of the excitation light beam L. The prism group 1000 may be a total internal reflection prism (TIR prism) composed of two prisms. The prism group 1000 is disposed between the mirror 900 and the light valve 300 on the transmission path of the excitation light beam L and is disposed between the light valve 300 and the projection lens 400 on the transmission path of the image light beam IB. After the excitation light beam L from the light deflection and diffusion element 120 is reflected by the minor 900 to the light beam adjustment element 800, the excitation light beam L passes through the light beam adjustment element 800 and then enters the prism group 400. The excitation light beam L enters the prism group 1000 and then is reflected by the prism group 1000 to the light valve 300. After the excitation light beam L is converted into the image light beam IB by the light valve 300, the image light beam IB enters and passes through the prism group 1000 and is then transmitted to the projection lens 400.

Based on the above, since the projection device 10I according to an embodiment of the disclosure is provided with the light deflection and diffusion element 120, the excitation light beam L is uniformly irradiated to the light valve 300 to provide a better imaging effect. The other advantages of the projection device 10I in this embodiment are similar to those of the projection device 10 in FIG. 2, and details thereof are not described herein again.

To sum up, in an embodiment of the disclosure, the illumination system and the projection device include the light deflection and diffusion element having a light diffusion effect so as to diffuse the light spot formed by the excitation light beam on the optical element of the projection device, thereby reducing the energy density and preventing the burning of the optical element in the projection device. Furthermore, the light deflection and diffusion element includes a plurality of inclined surfaces, which have different normal directions, so as to deflect the excitation light beam toward the central axis of the light deflection and diffusion element. Since the excitation light beam is deflected by the light deflection and diffusion element, the size of the condenser lens can be reduced to reduce the production cost of the illumination system and the projection device.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, comprising:

a light source module configured to emit at least one excitation light beam;

a light deflection and diffusion element disposed on a transmission path of the at least one excitation light beam and having a central axis, wherein the light deflection and diffusion element comprises:

a plurality of inclined surfaces each having a different normal direction and a plurality of microlenses, wherein the plurality of inclined surfaces are configured to divide the at least one excitation light beam into a plurality of sub-light beams, and the plurality of inclined surfaces are configured to deflect the plurality of sub-light beams toward the central axis of the light deflection and diffusion element; and an optical element disposed on a plurality of transmission paths of the plurality of sub- light beams, wherein the plurality of sub-light beams respectively form a plurality of sub-light spots on the optical element, a number of the plurality of sub-light spots is equal to a number of the plurality of inclined surfaces, and an maximum width of an irradiation region formed by the plurality of sub-light spots is less than or equal to an maximum width of a light spot formed by all of the at least one excitation light beam incident on the light deflection and diffusion element.

2. The illumination system according to claim 1, wherein the plurality of microlenses are respectively disposed on each of the plurality of inclined surfaces, and the plurality of microlenses are configured to diffuse the at least one excitation light beam.

3. The illumination system according to claim 2, wherein a first microlens and a second microlens adjacently arranged along an oblique direction are provided on one of the plurality of inclined surfaces, the first microlens is disposed between the central axis and the second microlens in the oblique direction, and a curvature center of the first microlens is located between two reference straight lines, wherein the two reference straight lines pass through centers of the first microlens and the second microlens respectively and are parallel to the central axis.

4. The illumination system according to claim 2, wherein each of the plurality of microlenses is a convex lens or a concave lens.

5. The illumination system according to claim 1, wherein the light deflection and diffusion element further comprises a bottom surface, the bottom surface is located on a first side of the light deflection and diffusion element, and the plurality of inclined surfaces are located on a second side opposite to the first side, wherein the bottom surface is a flat surface, a convex surface, or a concave surface.

6. The illumination system according to claim 5, wherein the bottom surface comprises a plurality of microlenses, and the plurality of microlenses are configured to diffuse the at least one excitation light beam.

7. The illumination system according to claim 1, wherein the optical element is the condenser lens, the central axis of the light deflection and diffusion element does not overlap with an optical axis of the condenser lens.

8. A projection device, comprising:

the illumination system according to claim 1;

a wavelength conversion element disposed on the transmission path of the plurality of sub-light beams from the light deflection and diffusion element and configured to convert the at least one excitation light beam from the light source module into a conversion light beam, wherein the at least one excitation light beam and the conversion light beam form an illumination light beam in a sequential manner by the wavelength conversion element, wherein the illumination light beam comprises at least one of the at least one excitation light beam and the conversion light beam;

a light valve disposed on a transmission path of the illumination light beam from the wavelength conversion element and configured to convert the illumination light beam into an image light beam; and a projection lens disposed on a transmission path of the image light beam and configured to project the image light beam out of the projection device.

9. The projection device according to claim 8, wherein the plurality of microlenses are respectively disposed on each of the plurality of inclined surfaces, and the plurality of microlenses are configured to diffuse the at least one excitation light beam.

10. The projection device according to claim 9, wherein a first microlens and a second microlens adjacently arranged along an oblique direction are provided on one of the plurality of inclined surfaces, the first microlens is disposed between the central axis and the second microlens in the oblique direction, and a curvature center of the first microlens is located between two reference straight lines, wherein the two reference straight lines pass through centers of the first microlens and the second microlens respectively and are parallel to the central axis.

11. The projection device according to claim 9, wherein each of the plurality of microlenses is a convex lens or a concave lens.

12. The projection device according to claim 8, wherein the light deflection and diffusion element further comprises a bottom surface, the bottom surface is located on a first side of the light deflection and diffusion element, and the plurality of inclined surfaces are located on a second side opposite to the first side, wherein the bottom surface is a flat surface, a convex surface, or a concave surface.

13. The projection device according to claim 12, wherein the bottom surface comprises a plurality of microlenses, and the plurality of microlenses are configured to diffuse the at least one excitation light beam.

14. The projection device according to claim 8, wherein the optical element is the wavelength conversion element, and the plurality of sub-light spots are formed on the wavelength conversion element.

15. The projection device according to claim 14, wherein an overlapping area of two adjacent ones of the plurality of sub-light spots is less than half of an area of any one of the plurality of sub-light spots.

16. The projection device according to claim 14, wherein the plurality of sub-light beams are transmitted in different directions, and the plurality of sub-light beams are crossed and then transmitted to the wavelength conversion element to form the plurality of sub-light spots.

17. The projection device according to claim 8, wherein the optical element is a condenser lens which is located between the light deflection and diffusion element and the wavelength conversion element, wherein the central axis of the light deflection and diffusion element does not overlap with an optical axis of the condenser lens.

18. A projection device, comprising:

the illumination system according to claim 1;

a light valve disposed on the transmission path of the at least one excitation light beam from the light source module and configured to convert the at least one excitation light beam into an image light beam; and a projection lens disposed on a transmission path of the image light beam and configured to project the image light beam out of the projection device.

19. The projection device according to claim 18, wherein the plurality of microlenses are respectively disposed on each of the plurality of inclined surfaces, and the plurality of microlenses are configured to diffuse the at least one excitation light beam.

20. The projection device according to claim 18, further comprising a condenser lens disposed on the transmission path of the at least one excitation light beam and disposed between the light source module and the light deflection and diffusion element.

21. The projection device according to claim 18, wherein the optical element is a light beam adjustment element which is disposed between the light deflection and diffusion element and the light valve.

* * * * *